Patented Oct. 27, 1925.

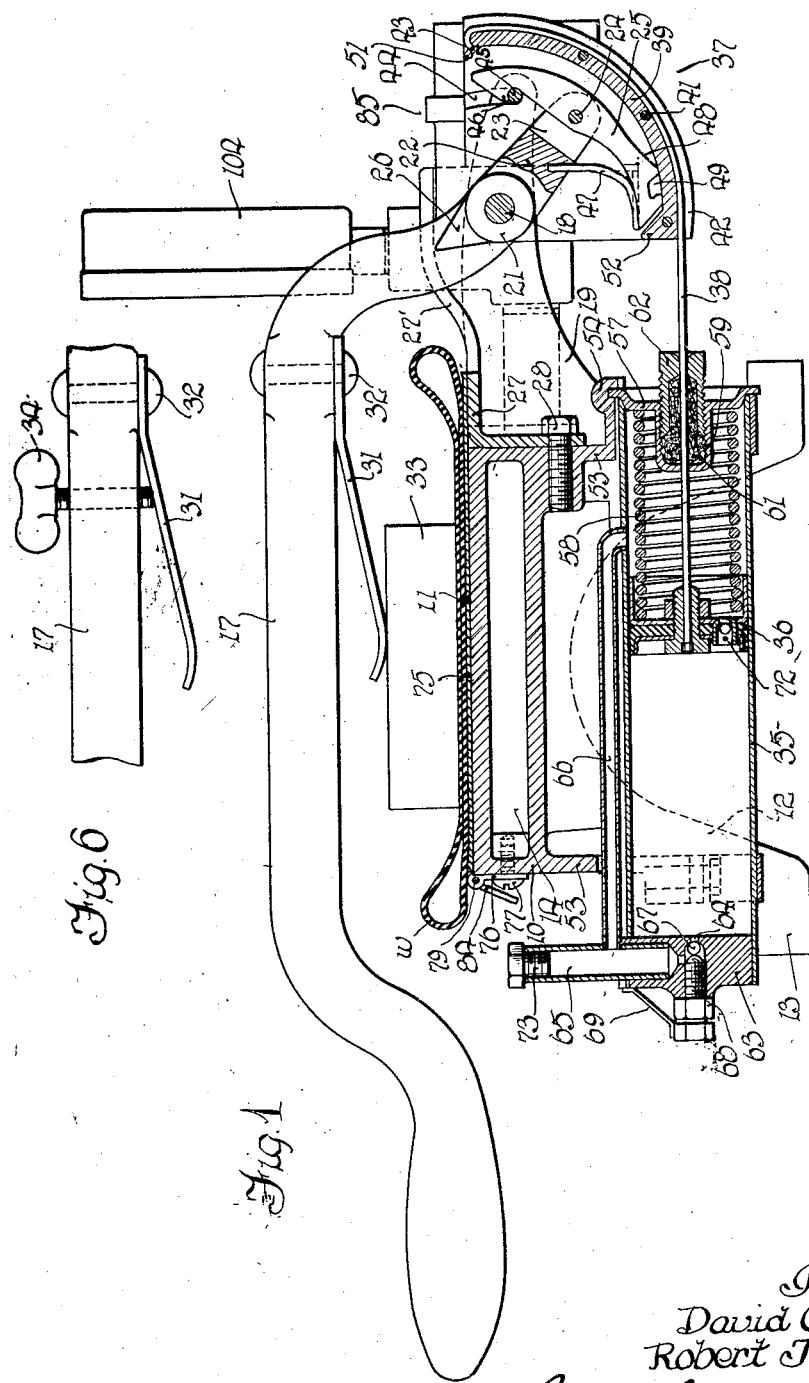

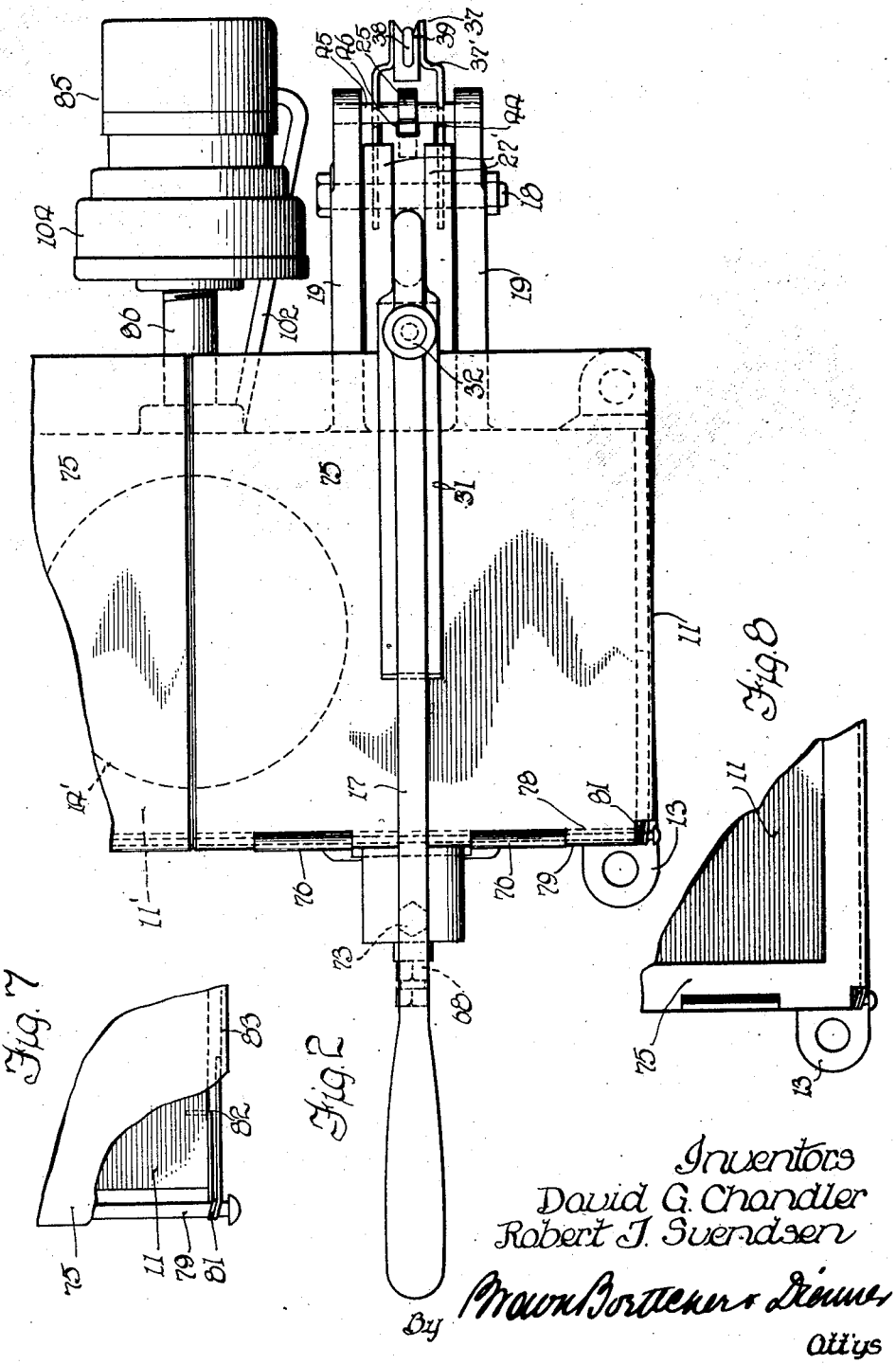

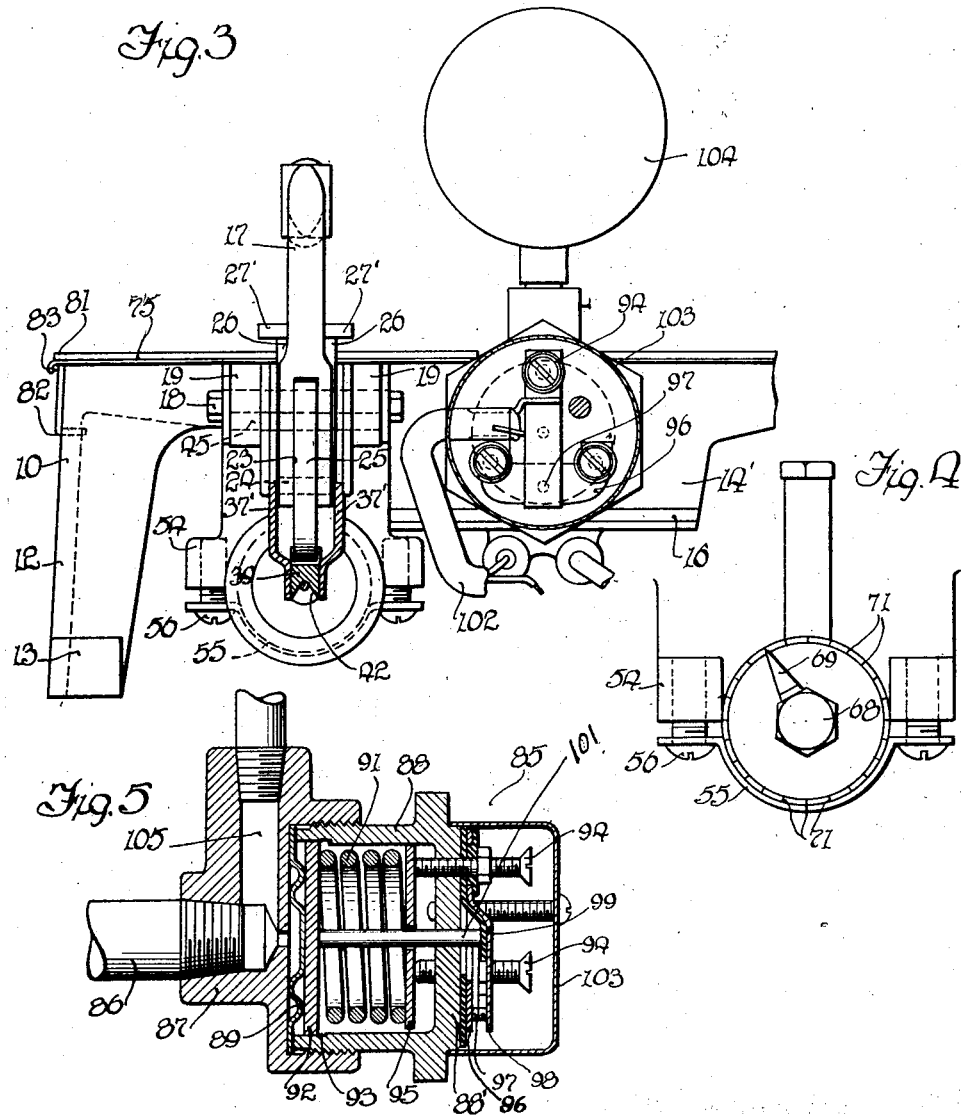

1,559,072

UNITED STATES PATENT OFFICE.

DAVID G. CHANDLER, OF RACINE, WISCONSIN, AND ROBERT T. SVENDSEN, OF INDIANAPOLIS, INDIANA.

VULCANIZER.

Application filed March 16, 1922. Serial No. 544,140.

*To all whom it may concern:*

Be it known that we, DAVID G. CHANDLER and ROBERT T. SVENDSEN, citizens of the United States, residing at Racine, in the county of Racine and State of Wisconsin, and at Indianapolis, in the county of Marion and State of Indiana, respectively, have invented a certain new and useful Improvement in Vulcanizers, of which the following is a full, clear, concise, and exact description, reference being had to the accompanying drawings, forming a part of this specification.

Our invention relates to vulcanizers and embodies improvements upon the type of vulcanizer disclosed in patent of David G. Chandler No. 1,450,794, dated April 3, 1923. The present vulcanizer is particularly of the portable, self-contained type, and has particular utility as equipment in service stations, garages, and tire repair shops.

One of the principal objects of the present invention is to provide improved means for automatically discontinuing the vulcanizing operation after the work has been completely vulcanized. More specifically, the present disclosure embodies an improved manner of separating the tube, or other piece of work being vulcanized, from the vulcanizing surface after the expiration of a selected time interval.

A further object is to provide improved time controlling means for performing this act of interrupting the vulcanizing operation at the end of the selected time interval. The advantages of this latter means reside particularly in the ability to quickly and conveniently reset the apparatus after each vulcanizing operation, and to conveniently and accurately adjust the time setting which is given the apparatus. The time measuring element of this mechanism is of very simple construction, preferably comprising a fluid pressure cylinder and piston. Relative motion between the cylinder and piston controls the instant of release of the vulcanizing mechanism, and this relative motion between the cylinder and piston is in turn determined by the egress of fluid through a restricted orifice, the size of which is adjustable for giving different time settings to the mechanism.

A further object is to provide an improved arrangement of rotary tripping and reset mechanism, connecting the above fluid pressure cylinder and piston with the vulcanizing members.

A further object is to provide an improved form of steam chamber for heating the vulcanizing surface, or surfaces, where the one heating element heats a plurality of surfaces in the vulcanizing unit.

In the accompanying drawings illustrating an embodiment selected for acquainting those skilled in the art with the manner of constructing and practicing our invention:

Figure 1 is a transverse sectional view through the device;

Fig. 2 is a fragmentary plan view of a duplex unit;

Fig. 3 is a fragmentary rear elevational view of the same;

Fig. 4 is an end elevational view of the hydraulic cylinder, illustrating the time adjusting pointer and dial;

Fig. 5 is a longitudinal sectional view through the improved form of automatic cut-out for controlling the circuit of the electrical heating means in accordance with the steam pressures prevailing in the steam chamber;

Fig. 6 is a fragmentary detail view of a modified construction; and

Figs. 7 and 8 are fragmentary plan views of the separating plate, the latter figure showing a modified construction.

The device may be constructed with one or a plurality of heated vulcanizing surfaces for performing one or a plurality of vulcanizing operations simultaneously. In the embodiment illustrated, we have shown two heated vulcanizing surfaces for carrying on two vulcanizing operations at the same time. The device in its entirety is assembled and supported upon a comparatively small casting 10, which may be secured to the work bench or retained as a portable unit for convenient moving about in the shop. The casting 10 comprises an upper table surface defining the two vulcanizing surfaces 11—11' and comprises corner legs 12 having feet 13 apertured for the reception of screws, studs or the like where the device is fastened down. The two vulcanizing surfaces 11 and 11' are heated by a steam chamber 14 which is formed in the casting below the vulcanizing surfaces. This steam chamber is of shallow depth adjacent the ends of the casing, but intermediate the vulcanizing surfaces is extended down to a somewhat greater depth to form a well 14′ for holding the charge of water employed for generating steam. The outer, shallow ends of the steam chamber 14 have their lower walls inclined down to the well 14′ to return the condensation thereto. Secured to the bottom of the well 14 is an electrical heating element 16, the control of which we shall hereinafter describe.

Extending across each vulcanizing surface 11—11′ is a pivoted arm or lever 17 which is adapted to hold the work in vulcanizing position. This lever is mounted on a pivot bolt 18 extending through two spaced arms 19 projecting integrally from the rear of the casting 10. At the pivot bolt 18, the lever 17 is expanded laterally to provide a greater width of hub 21, and below this hub portion extends an arm 22 which is slotted at its lower end as indicated at 23. Pivoted on a pin 24 in slot 23 is a pawl 25, which functions to lock the lever 17 in its lower position. Formed on each side of the lever 17 above the hub portion 21 are pointed lugs 26 on which bear the two arms 27′ of a slotter leaf spring 27 embracing the lever 17 and secured to the casting 10 by the cap screw 28. When the lever 17 is swung to its upright position, these leaf spring extensions 27′ engage on the flat forward surfaces of the pointed lugs 26 and retain the lever 17 in its upright position.

The lever 17 imposes a resilient vulcanizing pressure upon the work through a leaf spring 31 which is secured by the rivet 32 to the lever 17. The free end of this leaf spring is adapted to bear down upon a block 33 which is placed over the work to hold it in vulcanizing position and to distribute the pressure of the leaf spring 31 uniformly over the work. If desired, the pressure of the leaf spring 31 may be made adjustable, as by the provision of the adjusting screw 34 shown in Figure 6. The pressure acting through the leaf spring 31 operates to throw or assist in throwing the lever 17 to its upright position when the pawl 25 is tripped. When the lever 17 is down the spring 27 then pressing on the points of the lugs 26 in a plane in front of the bolt 18 will assist the spring 31 in holding the lever in closed position, but as the spring 31 is stronger than spring 27 it will raise the lever after release thereof from the pawl until the lug points reach a plane behind the bolt 18 and then both springs act together to raise the lever, the spring 27 by its pressure on the lugs rapidly swinging the lever to its uppermost position when it will engage against the front flat sides of the lugs and hold the lever raised.

The time controlling mechanism which governs the tripping of the pawl 25 comprises an oil cylinder 35 and piston 36, which operate to trip the device through the instrumentality of a rotary tripping and reset member 37 connected to the oil piston through a flexible wire or cable 38. Member 37 is built up of two parallel plates 37′ of accurate formation, which plates have pivotal mounting on the pivot bolt 18 outside of the lever 17. A peripheral segment 39 is secured between the side plates 37′ as by the rivets or the like 41. This segment is formed with a V shaped groove 42 in which tracks the wire or cable 38, the outer end of this wire or cable being extended through a hole in the segment 39 and being headed or otherwise secured to the segment as indicated at 43. The two side plates 37′ are slotted at 44 to accommodate a transverse pin 45 extending between the arms 19, these arms being extended beyond the pivot bolt 18 for supporting the pin 45. The upper end of the pawl 25 has a hook end 46 adapted to engage over the pin 45 upon resetting. The pawl is normally held in position for engaging over the pin 45 by a leaf spring 47 which is set in a slot in the lever portion 22 and bears at its outer end on the lower tail end of the pawl. This tail end has an inclined cam surface 48 and a notch 49 behind the cam surface. The tripping member 37 has a pivotal motion in its entirety independently of the lever 17 and pawl 25, and when this member has been revolved down to a point approaching its lower-most position under the action of the piston 36, an inwardly extending projection 51 on the upper end of the peripheral segment 39 engages with the cam surface 48 and trips the pawl 25 out of locked engagement with the pin 45. This permits the lever 17 to swing upwardly to interrupt the vulcanizing operation, as we shall presently describe. When the lever 17 swings into this upper position it rotates the pawl 25 in advance of the tripping member 37, so that the inclined notch engages over, or rotates past in position to engage over, an inwardly projecting shoulder 52 on the peripheral segment 39. As a result of this relation, when the lever 17 is swung downwardly for resetting, the notch 49 by engaging over the shoulder 52 rotates the tripping member 37 back to its original position. Disengagement of the notch 49 and the shoulder 52 is effected by the beveled nose of the pawl 25 camming the pawl outwardly to engage over the pin 45, and disengaging shoulder 52 from the notch 49.

The hydraulic cylinder 35 is slung directly under the vulcanizing surface and steam chamber in alignment with the rotary tripping member 37. The casting 10 is formed with webs 53 having semi-cylindrical hubs 54 embracing the upper portions of the cylinder 35, supporting bands 55 encircling the under part of the cylinder at each end and being secured to the bosses 54 by screws 56. The cylinder 35, which may be constructed of relatively light gauge tubing, is closed at its rear end by a head 57 which extends beyond the tubing and engages in a slot in the boss 54 to form an abutment for carrying the pressure of the compression spring 58 interposed between this head and the back of the piston 36. The head 57 is cupped inwardly at 59 to provide a long packing 61 and a long gland nut 62 for adequately packing the wire or cable 38 against leakage of oil. The front end of the cylinder 35 is closed by a head 63 having a discharge orifice 64 arranged to discharge into a well 65, which is set in the head 63. A tube 66 conducts the by-passed oil from the well 65 back into the cylinder 35 on the rear side of the piston 36. The size of the by-pass orifice is made adjustable in any suitable manner, such as by the provision of the ball 67 and screw 68 for thrusting the ball into position to restrict the orifice 64 to any degree desired. The head of the screw 68 carries a pointer 69 which is adapted to co-operate with dial markings 71 on the end of the cylinder for indicating the restriction imposed at orifice 64. The markings 71 may be calibrated in minutes or any other time intervals. The piston 36 is packed by a conventional cup leather or in any other suitable manner, and is provided with a one-way valve 72 to permit discharge of oil from the rear side to the front side of the piston when the device is being reset. The well 65 affords the reserve supply of oil, and any loss may be replenished by the removal of the screw plug 73 from the upper end of the well.

When the lever 17 is tripped, the work, represented by the inner tube W, is removed from vulcanizing association with the steam chamber 14, as through the instrumentality of the thin sheet metal plate 75 extending across the top of the casting. Each vulcanizing unit of the device is provided with a separate plate 75, these plates being hinged along the front marginal edge of the casting by the provison of hinge members 76 secured to the casting by screws 77 and interposed between the hinge loops 78 formed on the edges of the plate 75. A hinge rod 79 is passed through the aligned hinged loops from end to end of the device Each plate 75 is normally urged into an upper position removed from contact with the surface 11—11' of the casting by a coil spring 81 wound around the hinge rod 79 at each end thereof. One end of the spring 81 is bent laterally to engage in a hole in the casting as indicated at 82 and the other end of the spring is extended out under an overhanging flange 83 formed along the edge of the plate 75. Each plate is preferably provided with a tail extension 84 which limits the upward throw of the plate by striking the front of the casting 10.

The plate 75 is of such light gauge metal that it loses its heat immediately after rising from the surface 11 of the casting, so that further curing of the rubber is interrupted simultaneously with the raising of the plate 75 even though the rubber remains in contact therewith. For rapid absorption and release of heat this plate is preferably made of a metal having a high heat conductivity.

The control of the electrical heating element 16 is effected by a pressure responsive circuit interrupter 85 which has steam connection with the steam chamber 14 through the pipe 86. The pipe 86 enters an end cap 87 which is threaded over a cylindrical housing 88, a corrugated diaphragm 89 being clamped between the cap 87 and housing 88. A compression spring 91 is confined in the casing 88 and bears against a piston disc 92 having limited movement in a counter bore 93, uniformly distributing the pressure of the spring 91 over the back of the diaphragm 89. The pressure of the spring 91 can be conveniently adjusted by the provision of three screws 94 threading through the head 88' of the casing and bearing against a disc 95 against which the spring abuts. The contact mechanism is mounted on the back of the casing head 88' and comprises a contact strip 96 secured to the casing head by two of the screws 94 and bearing a stationary contact 97. Cooperating with this stationary contact is a movable contact 98 mounted on a leaf spring 99 secured to the casing by the other screw 94. The contact strip 96 and leaf spring 99 are suitably insulated from the casing and from the screws 94 in an obvious manner. A plunger rod 101 bears against the piston disc 92 and extends out of the casing under the leaf spring 99 in position for flexing said spring outwardly and breaking the circuit when the piston disc is thrust backwardly under a predetermined steam pressure. The conductors 102 enter through a shell 103 which is detachably secured to the casing head to house the contact mechanism. A conventional gauge 104 is connected to the steam chamber 14 through a passageway 105 in the cap 87, this gauge preferably having its dial calibrated to indicate the approximate temperature at the vulcanizing surfaces. By the provision of this gauge excessive or low temperatures can be quickly noted and compensation made therefor by adjustment of the heating element controlling circuit.

An overhead supporting arm is usually provided above each vulcanizer unit for conveniently supporting the tube or other work so as to dispose only the portion to be vulcanized in proximity to the vulcanizing surface. This portion of the tube is first properly disposed on the plate 75 and the tube and plate are then pressed downwardly against the vulcanizer and a block 33 or other pressure distributing member is placed over the tube. The lever 17 is then swung downwardly to impose the pressure of the spring 31 upon the block 33, this motion of the lever operating through the pawl 25 and tripping member 37 to draw the piston 36 back to the inner limit of its stroke, thereby compressing the spring 58. The completion of the downward movement of lever 17 trips the pawl 25 from hooked engagement with the shoulder 52, under the action of the nose of the pawl being cammed out by the pin 45 as hereinbefore described, and this immediately releases the piston 36 which at once begins its return travel toward the front end of the cylinder. A proper setting having been previously given the pointer 69, the speed of the piston travel will be such that at the expiration of the elected time interval the tripping projection 51 will engage with the cam surface 48 and cam the pawl 25 out of locked engagement with the pin 45. Instantly the lever 17 will be swung upwardly, initially under the pressure of the spring 31 and subsequently under the pressure of the leaf spring fingers 27', thereby permitting the plate 75 to interrupt the vulcanizing operation by removing the tube from heat absorbing relation to the vulcanizer.

One advantage of the plate 75 lies in the fact that if there is any tendency for the work to adhere to the surface against which it is pressed this will not interfere with the act of terminating the vulcanizing operation, nor can injury result to the rubber, because this plate moves directly with the rubber. The block 33 may be left free as shown, or may be pivoted to or otherwise associated with the spring 33 and lever 17. The hydraulic cylinder 35 affords a time controlling mechanism which is simple and compact and which can be readily disposed under the vulcanizer in an unobstrusive location. The time adjustment of the device by the mere regulation of the orifice 64 provides a very simple and easily operated method of regulation and one having a wide range of adjustment.

In the modified construction shown in Fig. 8 the plate 75 is constructed in the form of an open frame having the central part cut away to enable the tube to be placed in direct contact with the top of the casting. By its engagement with the tube around the portion to be vulcanized, this frame permits a direct contact between the tube and the heating surface and still insures separation of the tube from the heating surface when the lever 17 is tripped.

Our invention is obviously capable of being constructed and operated in various embodiments other than that herein shown and with numerous modifications and variations, and it is our intention that the appended claims be construed accordingly.

We claim:

1. In combination, means for imparting a vulcanizing heat to the work, and means interposed between the work and said means for terminating the transfer of vulcanizing heat to the work upon the completion of the vulcanizing operation.

2. In combination, a vulcanizing surface, means for heating said vulcanizing surface, and means interposed between said vulcanizing surface and the work for terminating the transfer of vulcanizing heat to the work at the expiration of a given time interval.

3. In combination, a vulcanizing surface, means for heating said vulcanizing surface, and means adapted for inter-position between the work and said vulcanizing surface for lifting the work from said surface at a predetermined time.

4. In combination, a vulcanizing surface, means engageable with the work between the work and said vulcanizing surface, and automatic means cooperating with said engaging means causing the latter to separate the work from vulcanizing association with the vulcanizing surface at the completion of the vulcanizing operation.

5. In combination, a vulcanizing surface, a plate adapted to be interposed between the work and said vulcanizing surface, and automatic means adapted to actuate said plate to terminate the vulcanizing operation.

6. In a vulcanizer, the combination of a vulcanizing surface, a moveable plate supported to lie upon said vulcanizing surface, the material to be vulcanized being heated by said plate, and adjustable time controlled means for moving said plate away from said vulcanizing surface upon the completion of the vulcanizing operation.

7. In combination, a vulcanizing surface, a moveable plate supported to lie upon said vulcanizing surface, the material to be vulcanized being heated by said plate and automatic means for moving said plate away from said vulcanizing surface upon the completion of the vulcanizing operation.

8. In combination, a vulcanizing surface, a movable plate supported to engage with the work substantially in the plane of said vulcanizing surface, clamping means for pressing the work into vulcanizing relation, and automatic means for tripping said clamping means and permitting said plate to separate the work from vulcanizing relation with said vulcanizing surface.

9. In combination, a vulcanizing surface, a separator plate engageable with said vulcanizing surface, means tending to separate said plate from said surface, a pivoted arm for clamping the work to said plate, and time controlled means for tripping said arm.

10. In combination, a frame comprising a vulcanizing surface, a separator plate hinged to said frame and engageable with said vulcanizing surface, means normally tending to separate said plate from said surface, a pivoted arm and cooperating spring means for yieldably pressing the work against said plate with said plate in contact with said vulcanizing surface, and means for automatically tripping said arm upon the completion of the vulcanizing operation.

11. In combination, vulcanizing means adapted to impart vulcanizing heat to the work, means for interrupting the vulcanizing operation, means for actuating said latter means upon the expiration of a given time interval, and means for automatically resetting said actuated means upon bringing a new piece of work into operative association with said vulcanizing means.

12. In combination, vulcanizing means for imparting a vulcanizing heat to the work, means for causing a relative separating motion between the work and the entire vulcanizing area of said vulcanizing means for interrupting the transfer of all vulcanizing heat to the work, automatic means controlling said interrupting means and adapted to actuate the latter at a predetermined time, and means automatically resetting said automatic means upon bringing a new piece of work into operative association with said vulcanizing means.

13. In combination, vulcanizing means, holding means for holding the work in vulcanizing relation to said vulcanizing means, means for interrupting the transfer of vulcanizing heat to the work, automatic means controlling said interrupting means and adapted to actuate the same at a predetermined time, said holding means being manually reset and means actuated by the manual resetting of said holding means for automatically restoring said automatic means to operative condition.

14. In a vulcanizer, the combination of vulcanizing means, a manually operated lever adapted to hold the work in operative association with said vulcanizing means, time controlled means operative to release said lever for discontinuing the vulcanizing operation, and means actuated by said lever for restoring said time controlled means.

15. In a vulcanizer, the combination of a vulcanizing surface, a manually operated lever adapted to be swung down over said surface for holding the work in operative association therewith, time controlled means having a starting position and adapted to release said lever, a spring tending to raise said lever, and means actuated by the manual resetting of said lever for restoring said time controlled means to its starting position.

16. In a vulcanizer, the combination of a vulcanizing surface, pivoted clamping means for retaining the work in association with said vulcanizing surface, time controlling means and latch mechanism in connection therewith and moving bodily rotarly about the pivot of said clamping means for tripping the latter.

17. In a vulcanizer, a combination of a frame comprising a vulcanizing surface, clamping means for holding the work in association with said vulcanizing surface, and a fluid pressure time measuring chamber disposed below said vulcanizing surface and having automatic tripping connection with said clamping means.

18. In a vulcanizer, the combination of a frame comprising a vulcanizing surface, clamping means for holding the work in association with said vulcanizing surface, fluid pressure means supported by said frame for determining the period of vulcanizing, and tripping means co-operating therewith for releasing said clamping means.

19. In a vulcanizer, the combination of a frame, a vulcanizing surface, means for heating said surface carried by said frame, means for holding the work in operative association with said vulcanizing surface, a hydraulic cylinder supported by said frame, a piston moving in said cylinder and operative to predetermine the vulcanizing period, and tripping mechanism connecting said piston with said holding means.

20. In combination, a vulcanizing surface, means for holding the work in association with said surface, a hydraulic cylinder, a piston in said cylinder, a latch for retaining said holding means in vulcanizing position, a rotary tripping member engageable with said latch, and a flexible member connecting said piston with said rotary tripping member.

21. In combination, vulcanizing means, clamping means for holding the work in cooperation with said vulcanizing means, a latch and cooperating shoulder for holding said clamping means in vulcanizing position, a hydraulic cylinder and piston, and a rotary tripping member actuated by said piston for tripping said latch and shoulder.

22. A portable vulcanizing device comprising a frame, a steam generating chamber, cooperating heating means for said chamber, a vulcanizing surface heated by steam formed in said chamber, clamping means mounted on said frame for holding the object to be vulcanized in association with said vulcanizing surface, and fluid pressure means supported by said frame and measuring the time interval of vulcanization for releasing said clamping means after a predetermined period of time.

23. A portable vulcanizing device comprising a frame, a steam generating chamber associated with said frame, electrical heating means supported below said chamber, a vulcanizing surface heated by steam formed in the chamber, a clamping member supported on said frame for holding the object to be vulcanized in association with said vulcanizing surface, a hydraulic cylinder supported by said frame, a piston in said cylinder, and tripping mechanism connecting said piston with said clamping member for releasing the latter upon the completion of the vulcanizing operation.

24. In a vulcanizer, the combination of means for imparting a vulcanizing heat to the work, and fluid pressure means for automatically interrupting the transfer of vulcanizing heat from said means to the work.

25. In a vulcanizer, the combination of a vulcanizing surface, means for causing a complete and entire separating motion between the work and said vulcanizing surface for interrupting the transfer of any heat to the work, and fluid pressure means for controlling said latter means.

26. In a vulcanizer, the combination of a vulcanizing surface, holding means for disposing the work in operative association to said vulcanizing surface, a time measuring fluid pressure chamber below said vulcanizing surface and means controlled by said chamber for automatically controlling the application of vulcanizing heat from said vulcanizing surface to the work.

27. In a vulcanizer the combination of the vulcanizing surface, a pivoted member for retaining the work in association with the vulcanizing surface, a latch and cooperative shoulder for holding said pivoted member in vulcanizing posiitons, a hydraulic cylinder, a piston therein, a spring normally tending to thrust said piston, to one end of said cylinder, a by-pass communicating with the latter end of said cylinder, means for adjusting said by-pass, a rotary tripping member operable to dis-engage said latch and shoulder, and a flexible member connecting said piston with said tripping member.

28. In a vulcanizer, the combination of a vulcanizing surface, holding means for retaining the work in operative association with the vulcanizing surface, tripping mechanism for tripping said holding means at the expiration of a given time interval, said tripping mechanism comprising a hydraulic cylinder, a piston therein, spring means normally tending to force said piston towards one end of said cylinder, a by-pass for circulating the fluid around said piston, and adjustable means for regulating said by-pass, and thereby the interval of vulcanization.

29. In a vulcanizer, the combination of a vulcanizing member, a movable arm for retaining the work in association with said vulcanizing member, spring means cooperating with said arm for imposing a resilient pressure on the work, and secondary spring means assisting the action of said first spring means.

30. In a vulcanizer, the combination of a vulcanizing surface, a clamping arm for retaining the work in association with said surface, said arm having an operative and an inoperative position, spring means co-operating with said arm for imposing a resilient pressure on the work, and secondary spring means assisting said first spring means when said arm is in its operative position and operative to hold said arm in its inoperative position.

31. In combination, a vulcanizing surface, support of heat conductive material for supporting work to be vulcanized, means for applying said support against said surface to receive and conduct vulcanizing heat to the work thereon, and means for automatically removing said support from said surface at the completion of the vulcanizing operation.

32. In combination, a vulcanizing surface, a support for work to be vulcanized, means for pressing said support against said surface whereby the work thereon will be subjected to vulcanizing heat, means operating automatically to release said pressure after completion of the vulcanizing operation, and means independent of said first mentioned means for then automatically removing said support from said surface.

In witness whereof, we hereunto subscribe our names this 27th day of February, 1922, and this 6 day of March, 1922.

DAVID G. CHANDLER.
ROBERT T. SVENDSEN.